United States Patent [19]

Vincent et al.

[11] Patent Number: 5,010,580
[45] Date of Patent: Apr. 23, 1991

[54] METHOD AND APPARATUS FOR EXTRACTING INFORMATION FROM FORMS

[75] Inventors: Kent D. Vincent, Cupertino; Rueiming Jamp, Mountain View, both of Calif.

[73] Assignee: Hewlett-Packard Company, Palo Alto, Calif.

[21] Appl. No.: 398,677

[22] Filed: Aug. 25, 1989

[51] Int. Cl.$^5$ .............................................. G06K 9/00
[52] U.S. Cl. .................................... 382/17; 382/16; 382/61; 250/226; 358/76; 358/78
[58] Field of Search .................... 382/17, 61; 250/226; 358/76, 78

[56] References Cited

U.S. PATENT DOCUMENTS

| | | | |
|---|---|---|---|
| 3,938,088 | 2/1976 | Clark | 382/17 |
| 4,479,242 | 10/1984 | Kurata | 382/17 |
| 4,760,606 | 7/1988 | Lesnick et al. | 382/61 |
| 4,812,904 | 3/1989 | Maring et al. | 382/17 |

*Primary Examiner*—David K. Moore
*Assistant Examiner*—Daniel Santos

[57] ABSTRACT

A system for extracting handwritten or typed information from forms that have been printed in colors other than the color of the handwritten or typed information. The information extraction system includes a detector for detecting color values for scanned pixel locations on a printed form; a comparator for comparing the color values with reference color values; an identifier for identifying ones of the scanned pixel locations that have color values that correspond to the reference color values; and an optical character recognition engine for receiving data regarding the identified locations.

7 Claims, 4 Drawing Sheets

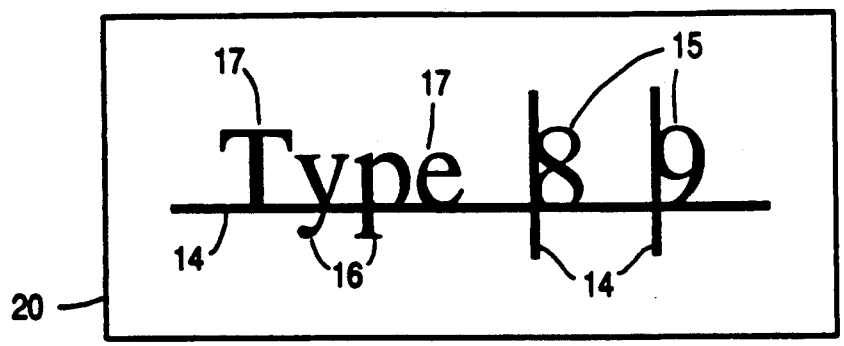
FIG. 1
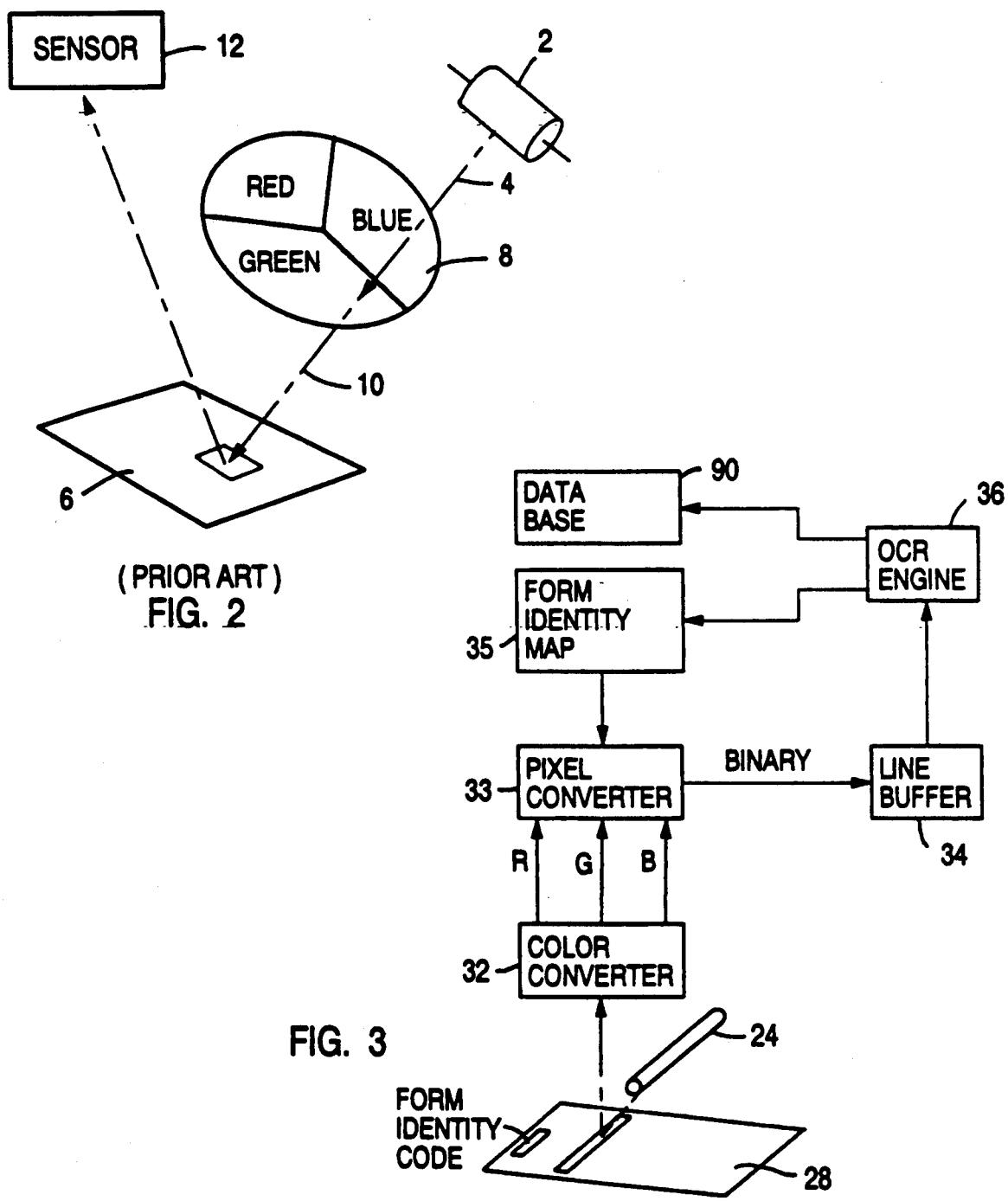
(PRIOR ART)
FIG. 2
FIG. 3

PIXEL = ( 8 BITS RED, 8 BITS GREEN, 8 BITS BLUE )

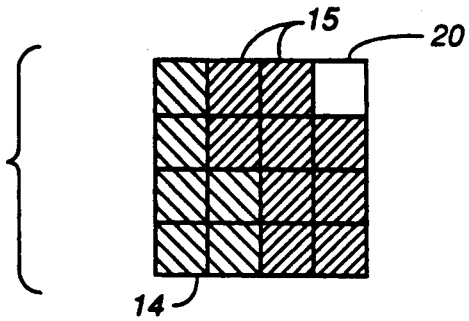
FIG._8a
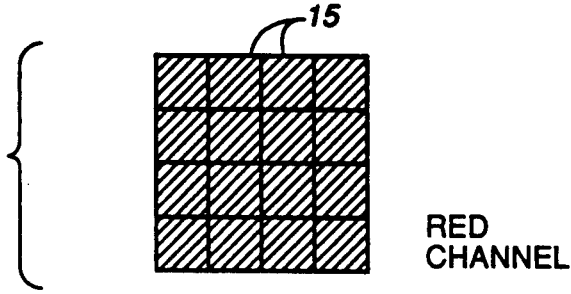
FIG._8b
RED CHANNEL
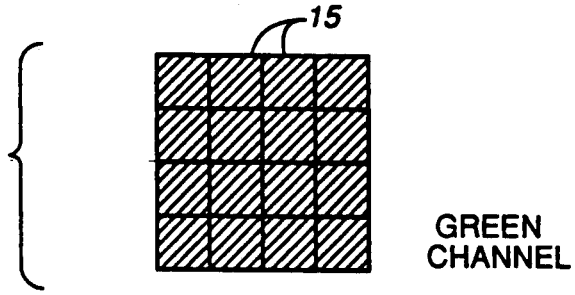
FIG._8c
GREEN CHANNEL
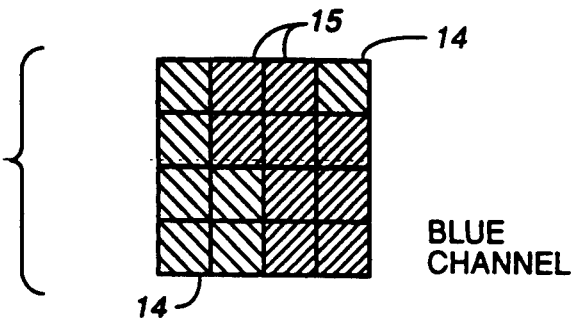
FIG._8d
BLUE CHANNEL
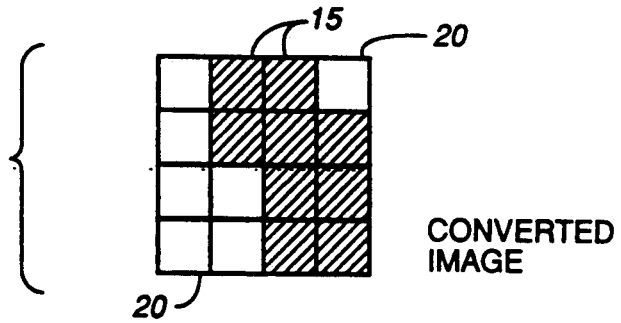
FIG._8e
CONVERTED IMAGE

METHOD AND APPARATUS FOR EXTRACTING INFORMATION FROM FORMS

BACKGROUND OF THE INVENTION

1. Field of the Invention:

The present invention generally relates to systems for extracting information from printed forms by using optical character recognition scanners.

2. State of Art:

Although optical character recognition (OCR) scanners are well known, it is still common practice to manually extract information from printed forms. For example, information which has been written or typed onto medical forms and the like is usually extracted manually. Manual extraction of information from printed forms is time-consuming and subject to human error, but the extraction of information from forms with OCR scanners can also create errors.

FIG. 1 shows examples of situations that can cause conventional OCR scanning systems to err in extracting information from printed forms. Generally speaking, the errors occur because information that has been typed or written onto a printed form is slightly mis-positioned. For instance, the drawing shows characters 15 that have been typed onto a form at positions outside of zones defined by printed vertical lines 14. In addition, the drawing shows characters 16 that are positioned such that they descend over a printed horizontal line 14.

Characters 15 and 16 in FIG. 1 may be incorrectly extracted from a printed form by a conventional OCR scanning system because the OCR control system is confused by the placement of the characters across printed lines. More particularly, an OCR system may operate to only identify information which is printed in certain pre-defined reading zones and, therefore, may omit information which is printed or typed onto a form in transgression of its reading zones.

In the prior art, OCR scanning systems have been proposed that operate in ways to reduce the above-discussed difficulties in extracting handwritten or typed information from printed forms. For example, a workstation for extracting information from printed forms having particular colors is described in a brochure entitled "The Future Data Entry Workstation—POLYFORM—The Form Reader for Automatic Character Reading from Forms and Documents Written by Hand or Machine".

FIG. 2 shows a simplified example of one of the POLYFORM workstations. Generally speaking, the workstation includes a light source 2 which scans a beam 4 across a colored form 6. Interposed between the light source and the colored form is a wheel 8 comprised of filters, each of which has a different color. In operation of the workstation, a particular color filter is selected to match the color of the printed form, thereby allowing an OCR scanner 12 to discriminate typed or handwritten information from information printed on the form—provided that the handwritten or typed information has a different color than the printed form.

The system of FIG. 2 has several disadvantages. One disadvantage is that a different color filter must be selected whenever the color of a form is changed. Moreover, the filter must be selected manually, since the system lacks any intrinsic means of determining the required color of the filter. Another disadvantage is that the system usually cannot successfully extract information from multi-color forms. For instance, the system may not be able to successfully extract information from pink forms that have red high-lighted sections or blue sections.

A further disadvantage of the system of FIG. 2 is that the system can only operate upon forms of a limited number of colors. This limitation follows from the fact that, for practical reasons, the color wheel can comprise only a limited number of color filters. In a commercial sense, this limitation may be the most critical of all—since the system may become inoperative when there are relatively slight changes in color from one form to another due, for example, to aging by prolonged exposure to bright sunlight or to different printing runs.

SUMMARY OF THE INVENTION

Generally speaking, the present invention provides improved systems for extracting handwritten or typed information from forms that have been printed in one or more colors that are different than the color of the handwritten or typed information. In the preferred embodiment of the present invention, the information extraction system includes means for detecting two or more color values for scanned pixel locations on a printed form; means for comparing the color values with two or more reference color values; and an optical character recognition engine for receiving data derived from the comparisons.

BRIEF DESCRIPTION OF THE DRAWINGS

The present invention can be further understood from the following detailed description in conjunction with the appended drawings. In the drawings:

FIG. 1 is a drawing that provides examples of circumstances that can cause errors in the extraction of handwritten or typed information from a printed form;

FIG. 2 is a schematic diagram of a system according to the prior art;

FIG. 3 is a functional block diagram of a system according to the present invention;

FIGS. 8a through 8e are diagrams that illustrate operation of the system of FIG. 3.

DETAILED DESCRIPTION OF THE PREFERRED EMBODIMENTS OF THE INVENTION

Figure 4:
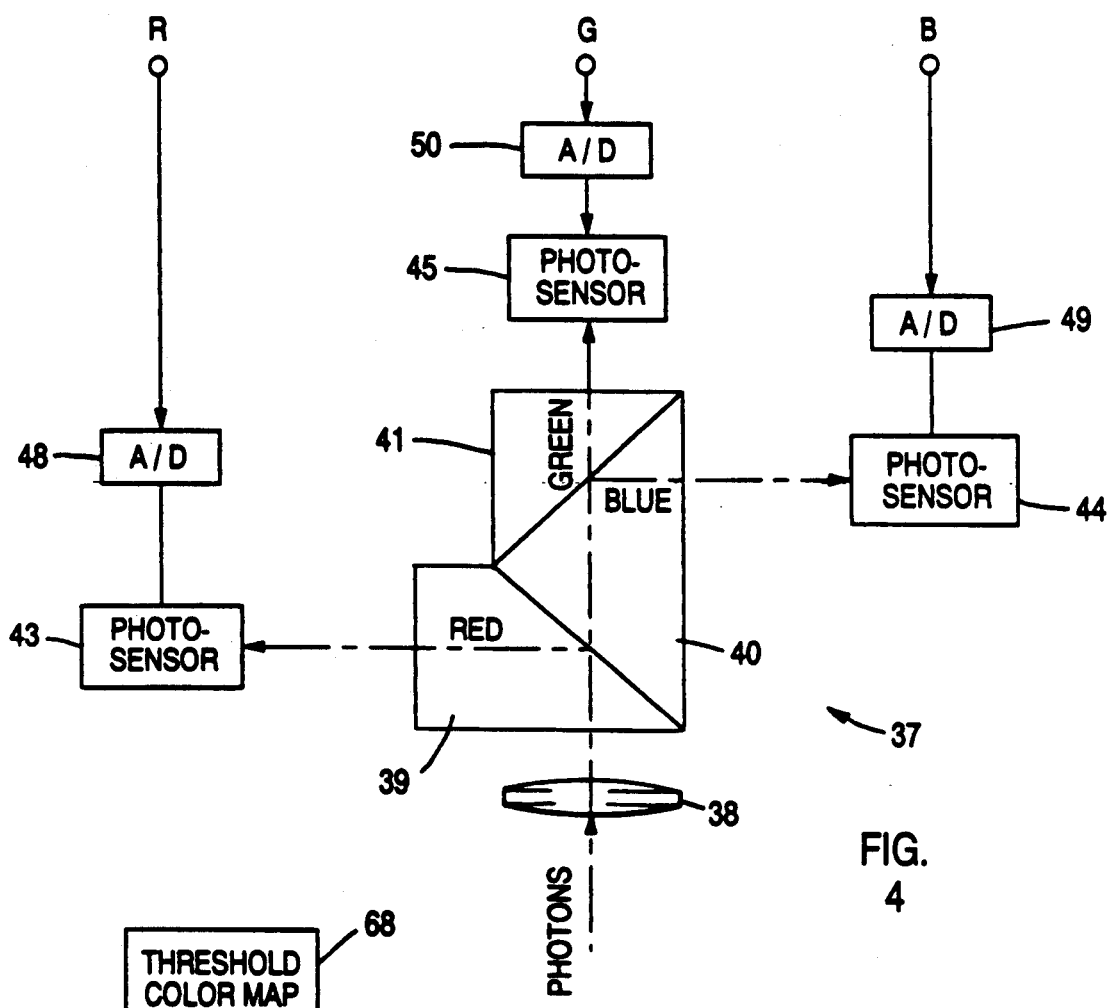
FIG. 4 is a functional block diagram of a dichroic filtering system for use with the system of FIG. 3.

FIG. 3 shows a system for extracting information that has been handwritten or typed in one color onto a form 28 printed in a different color. For example, the system of FIG. 3 can be employed for extracting information that has been typed in black ink onto a yellow form that has been printed with red ink.

The system in FIG. 3 generally includes a multichromatic light source 24 for scanning the form 28 and a color convertor 32 for detecting color values of scanned areas (i.e., pixel locations) on the form. As will be described below, usually three primary color values (e.g., red, green and blue) are detected for each pixel location. Further, the system includes a comparator means 33 for receiving signals from color convertor 32 for each of the detected colors. Comparator means 33 is also connected to a map means 35 for receiving reference color values that serve as a basis for comparison. Still further, a buffer 34 is connected for storing digital output signals from comparator means 33. The output of the buffer is connected to a conventional OCR engine 36.

The color convertor 32 in FIG. 3 can have any one of several conventional embodiments. For example, the color convertor can be as taught in U.S. Pat. No. 4,709,144 (Vincent), the entire disclosure of which is incorporated herein by reference. The color convertor 32 can, alternatively, be embodied as the dichroic filter which is shown in FIG. 4.

In the FIG. 4 embodiment, the color convertor comprises a three-facet prism, generally designated by the number 37, a lens 38 for directing collimated light onto one facet of the prism, an array of photosensitive detectors 43–45 that receive light emerging from the prism, and an array of analog-to-digital convertors 48–50 that receive signals from detectors 43–45, respectively. It should be understood that at least two of the facets of prism 37, including the facet that initially receives light from lens 38, are coated to provide dichroic filtering. Suitable coatings are well known and usually comprise thin, multi-layer interference coatings.

In practice, the photosensitive detectors 43–45 in FIG. 4 can be charge-coupled diodes (CCDs). Such detectors each provide at least one photosite for sensing incident light. Output signals from such detectors normally are analog signals.

In operation of the dichroic filter of FIG. 4, collimated light from lens 38 is initially separated into two components, one of which is reflected from the first facet of the prism and one of which is transmitted through the prism. At the first facet, the color separation, or "filtering", action is due to optical interference at the thin film layer on the facet. The same filtering action occurs as light strikes other facets of the prism.

In the embodiment of the dichroic filtering system shown in FIG. 4, the first facet of prism 37 reflects red light and transmits green and blue light. The second facet of the prism reflects blue light while transmitting green light. Accordingly, photosensitive detector 43 receives red light, detector 44 receives blue light, and detector 45 receives green light.

Further in operation of the dichroic filtering system of FIG. 4, analog signals from detectors 43, 44, and 45 are converted to digital values by the analog-to-digital convertors 48, 49, and 50, respectively. Thus, the signals from the convertors represent, in digital terms, the primary color values of the multi-chromatic light which is incident on the first facet of dichroic prism 37. In the illustrated embodiment, the output of analog-to-digital convertor 48 represents red values of the incident light, the output of convertor 49 represents blue values, and the output of convertor 50 represents green values. The term "tri-stimulus" will be used in the following to describe those red, green and blue values collectively.

In typical practice, each primary color value is digitally represented with six to eight binary bits and, accordingly, eighteen to twenty-four bits are available to describe the tri-stimulus color content of each pixel location. With such resolution, a wide variety of inks and colors of forms can be employed in the system of FIG. 3. Accordingly, the system is not limited to use with forms of particular colors or, indeed, to single color forms.

Additional circuitry, not shown in FIG. 4, can be provided for normalizing and calibrating output signals from convertors 48–50. The normalization circuitry can, for example, compensate for non-linear optical detectors. Also, multiple optical detectors can be provided for each color channel; for instance, detector 43 could comprise an array of separate detectors.

Figure 5:
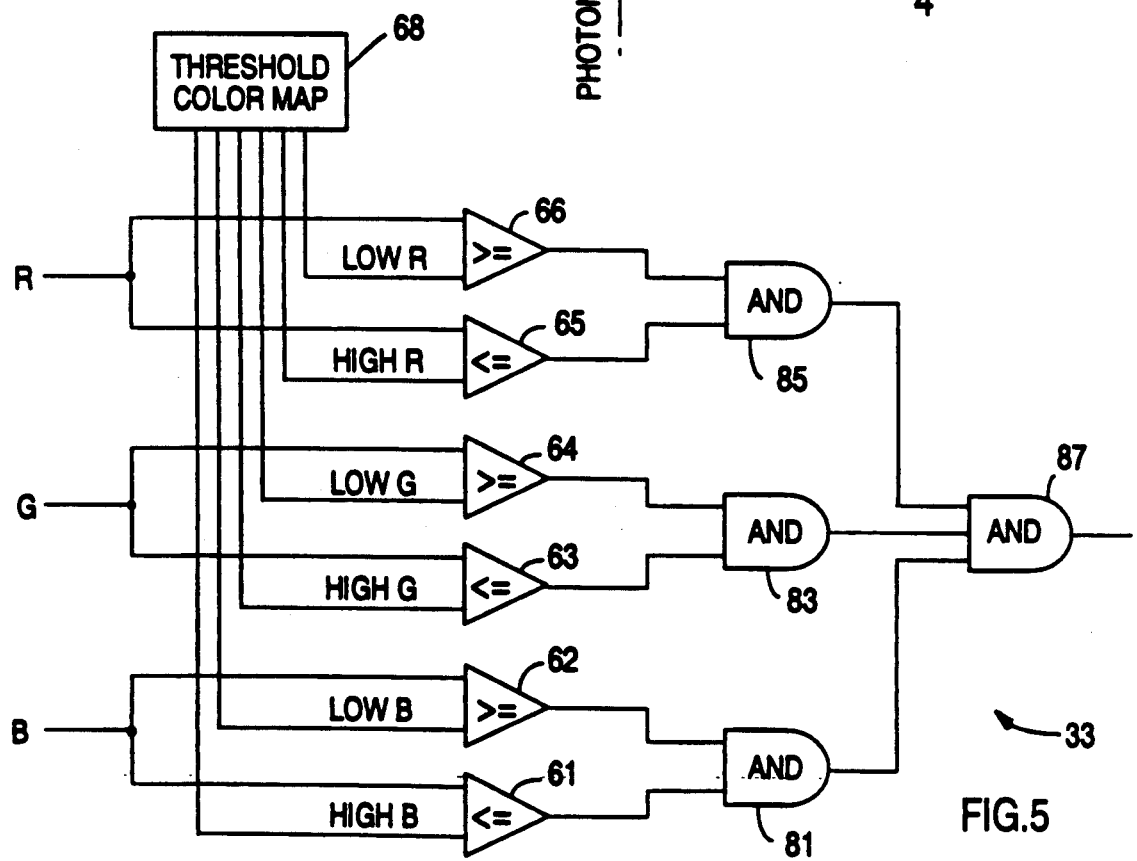
FIGS. 5 is a schematic diagram of a circuit for use with the system of FIG. 3.

FIG. 5 shows comparator means 33 embodied as a circuit including, among other elements, a parallel array of six comparators 61–66 which are paired in three sets. One input to each of the six comparators is a reference value provided from a threshold color map 68. For example, comparator 61 receives a "high blue" reference signal from map 68 and its paired comparator 62 receives a "low blue" reference signal from the map. Similarly, paired comparators 63 and 64 receive high and low green reference, respectively, from the map. Also, paired comparators 65 and 66 receive high and low red reference signals, respectively. In practice, the reference values provided by map 68 are either set to the color values of the colored form or to the color values of the information to be extracted from the form; usually, the former setting is more convenient Also in the circuit of FIG. 5, the three pairs of comparators receive the above-discussed tri-stimulus signals. Specifically, the paired comparators 61 and 62 receive detected blue signal values, the paired comparators 63 and 64 receive detected green signal values, and the paired comparators 65 and 66 receive detected red signal values.

Further in the circuit of FIG. 5, output lines from the sets of paired comparators are connected to AND gates 81, 83, and 85, respectively. Specifically, output lines from paired comparators 61 and 62 are connected to AND gate 81, output lines from paired comparators 63 and 64 are connected to AND gate 83, and output line from the paired comparators 65 and 66 are connected to AND gate 85. Finally, output lines from each of the three AND gates are connected to an AND gate 87.

Generally speaking, the circuit of FIG. 5 operates such that the output of AND gate 87 is a single binary bit (i.e., a binary "0" or "1") which indicates whether scanned information should be extracted from a printed form.

In one specific mode of operation of the circuit of FIG. 5, one of the comparators in each of the three pairs produces a "HI" output (i.e., a binary 1) if a detected primary color value for a given pixel location is greater than, or equal to, the low threshold value for that primary color and, otherwise, will produce a "LO" output signal (i.e., a binary 0). For example, comparator 66 would provide a binary HI output if the detected red value at a given pixel location were greater than, or equal to, the low red reference value provided by color map 68. Otherwise, comparator 66 would provide a LO output. Similarly, comparator 64 would produce a HI output if the detected green value for the given pixel location were greater than, or equal to, the low green reference provided by map 68 and, otherwise, would produce a LO output. And, comparator 62 would operate in a manner similar to comparators 64 and 66.

Further as to the example provided in the preceding paragraph, the second comparator in each of the three pairs will produce a HI output if the detected color value for the given pixel location is less than, or equal to, the high threshold value for the given color and, otherwise, would produce a LO output. For example, comparator 65 will produce a HI output if the detected red value for the given pixel location is less than, or equal to, the high reference red color value. The comparators 63 and 61 will operate similarly.

Thus, with respect to operation of the circuit of FIG. 5 according to the specific example provided above, output signals from both comparators in any one of the pairs will be HI only if the detected color value for a given pixel location is between the low and high threshold values for the color which is referenced to that pair of comparators. For instance, comparators 63 and 64 will both provide HI outputs only if the green value of a detected pixel location is between the high threshold green value provided to comparator 63 and the low threshold green value provided to comparator 64.

Because AND gates 81, 83, 85 and 87 in the circuit of FIG. 5 will each provide HI outputs only if all of their inputs are HI, a HI output from the final AND gate 87 indicates that the detected primary color values (i.e., the detected red, green and blue values) for a particular pixel location are all between the preselected upper and lower threshold limits. On the other hand a LO output from AND gate 87 indicates that at least one of the red, green or blue color values at a scanned location exceeds at least one of the threshold values. In practice, an invertor (not shown) can be added to the output of AND gate 84 to reverse the binary output signal from AND gate 87 as desired.

With the preceding example in mind, it can be understood that, for appropriately selected threshold values, AND gate 87 in the circuit of FIG. 5 can be made to output binary signals whose values indicate whether information at particular locations should be extracted from a printed form. In other words, the binary output signals from AND gate 87 indicate whether handwritten or typed information on a printed form is to be extracted from the form (provided that the color of the form and the printing thereon is substantially different from the color of the handwritten or typed information). Specifically, according to the preceding example, a binary "1" output from AND gate 87 would indicate that information at a detected pixel location corresponds to the printed form while, on the other hand, a binary "0" output for the same location would indicate that the information is to be extracted from the form. The ranges between the threshold values allow the system of FIG. 3 to accommodate minor color variations form without creating information extraction errors.

Stated somewhat differently, the system of FIG. 5 can be described as operating to code pixel locations as white when the locations do not have color values that correspond to the approximate color of information to be extracted from a printed form and to black when the locations have color values that correspond to the approximate value of information to be extracted.

At this juncture, it should be emphasized the preceding explanation provides only one example of a mode in which the circuit of FIG. 5 could be operated. Those skilled in digital logic design will understand that the circuit can be operated in different modes depending upon the reference values and comparators selected. Those alternative modes of operation may provide advantages not found in the mode of operation described in the preceding example.

Operation of the complete system of FIG. 3 can now be understood. Initially, it should be assumed that a printed form 28 having a particular color is placed into a position for scanning by light source 24. It should also be initially assumed that appropriate reference values have been stored in the threshold color map 68 of FIG. 5. Then, as each location on the form is scanned, light is reflected onto color convertor 32 and the convertor functions to separately detect the red, green and blue color values for the scanned location. Output signals from the convertor then are provided to comparison means 33. The comparison means operates, as described above, to provide binary data that indicates whether the scanned information is to be extracted from the form. After a given pixel location has been identified as containing information for extraction, OCR engine 36 can employ the binary data (via buffer 34) to identify text and graphics which have been handwritten or typed onto the form.

Further as to operation of the system of FIG. 3, it can be noted that handwritten or typed information extracted from a printed form can be stored, as in a data base 90, for later two-color printing (e.g., black and white printing). Also, the information stored in the data base 90 can be reproduced and otherwise manipulated independently of the form from which the information was extracted.

In an alternative embodiment of the system of FIG. 3, the tri-stimulus color values for each pixel location can be converted to gray scale signals. Then, for pixel locations which contain information which is to be extracted from a form, the gray scale values can be passed to OCR engine 36 in place of the binary outputs of convertor 33. (The gray scale conversion techniques are well known, and standard algorithms for converting tri-stimulus color representations to luminance (monochrome) and chrominance representations are provided in many handbooks.) The gray scale values can then be stored and/or printed to provide text and graphics in shades of gray.

The buffer 34 in the system of FIG. 3 can serve two primary functions. First, the buffer can collect sufficient scan lines to allow OCR engine 36 to perform the character recognition function. Secondly, the buffer can allow the system to accommodate different pixel processing rates by its various components. (Typically, the OCR engine is the slowest component.) In practice, the buffer is usually sized to store the pixel contents of an entire page; alternatively, it may be interfaced to a scan controller (not shown) to temporarily halt line scanning until the OCR engine has removed the current contents of the buffer.

To further automate the system of FIG. 3, means can be provided to allow the system to automatically identify a form and its color scheme so that threshold values appropriate for the form can be automatically loaded into the threshold color map for the system. Such means can include, for example, means for identifying a form identity code that is printed on forms in a standard location (e.g., in the upper left corner of each form). A suitable code would be one, such as a bar code, consisting of characters that can be recognized by the OCR engine and sequenced to have a standardized, unambiguous meaning. With such a standardized practice, a scanner can be instructed to preliminarily scan each form for the identity code.

In practice, the above-discussed form identity code may include information about a form in addition to its colors. For example, the code may indicate location at which data will be found on a form. Such codes could increase the speed of a system such as in FIG. 3 since a scanner could be instructed to skip predetermined sections of forms.

Figure 6:
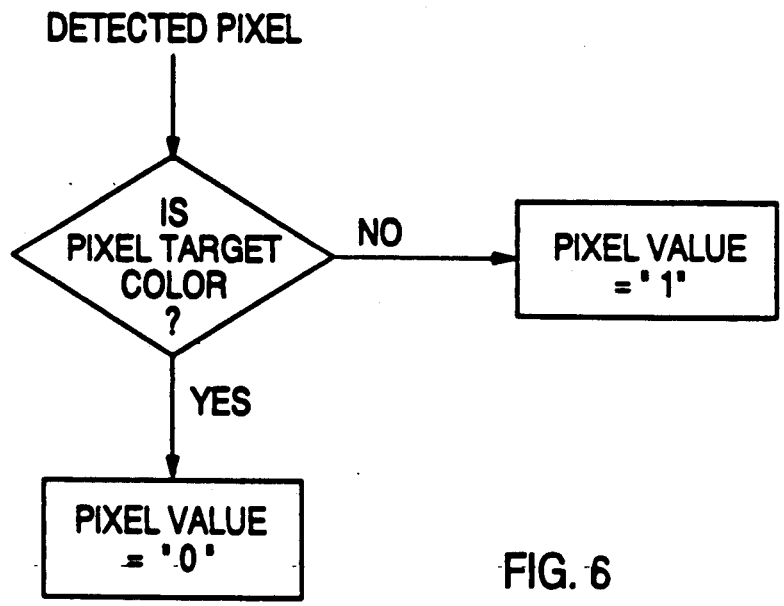
FIGS. 6 and 7 are flow charts that illustrate two algorithms for use with the system of FIG. 3.
Figure 7:
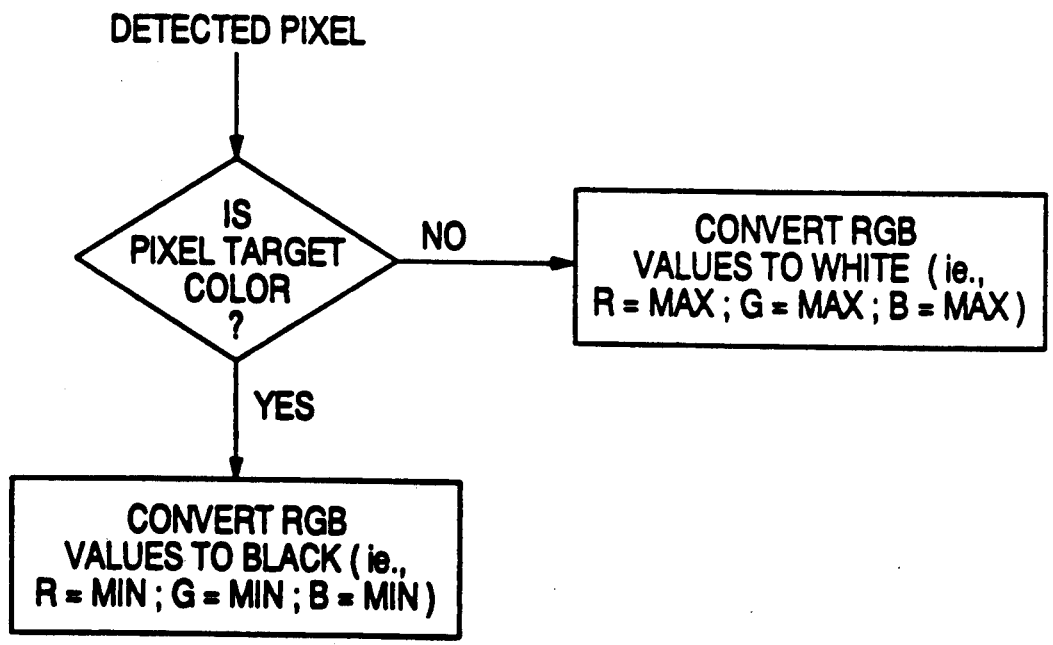

FIGS. 6 and 7 show logical flow charts that summarize steps in processes for extracting information from multi-colored forms. Generally speaking, the flow charts depict processes wherein color values are compared to target color values at each scanned pixel location. The target color values are equivalent to the above-discussed threshold values.

In the flow chart of FIG. 6, a pixel location is assigned a binary value of 0 if the detected color value at the location equals or exceeds the target color value; otherwise, the location is assigned a binary value of 1. In the flow chart of FIG. 7, if any one of the primary color values detected at a particular pixel location equals or exceeds a corresponding target value, then all of the detected color values for that location are converted to their maximum values (e.g., binary 1). However, if any one of the detected color values is less than the corresponding target value for that location, then all of the detected color values for that location are converted to their minimum values (e.g., binary 0).

Operation of the system of FIG. 3 can be further understood by reference to FIGS. 8a through 8e. In FIG. 8a, the sixteen squares comprising the larger square can each be understood to represent a pixel location. In turn, the sixteen pixel locations can be understood to represent a portion of one of the characters 15 in FIG. 2 which has transgressed a printed prompt line 14. (It will be remembered that the prompt line is printed in a color different than the character color.) For purposes of this example, it can be assumed that the character is typed or written in black ink and that any printing on the form is blue.

During a scan of the pixel locations shown on FIG. 8a, the red and green components of light which strike the blue colored pixel locations are absorbed. Therefore, the blue colored pixel locations reflect little or no red and green light to color convertor 33 in the system of FIG. 3. Accordingly, for the blue colored pixel locations, the threshold values for the red and green colors will not be reached and the binary outputs on the red and green channels will be LO. The binary output on the blue channel will, in contrast, be HI.

The pixel locations in FIG. 8a which are approximately black also will absorb the red and green components of the source light. Accordingly, the binary output of convertor 33 will remain "LO" on the red and green channels for the black colored pixel locations. Moreover, those locations will absorb the blue components of the incident light. Therefore, the blue channel output will be LO for the black colored locations.

FIG. 8e shows the converted image for the preceding example. It will be noted that the result of the conversion is to distinguish the black characters from the blue form.

In view of the preceding discussion, it can be understood that the system of FIG. 3 can be adapted to extract information of any specified color (e.g., blue) from any other colors (e.g., red) on a form. Accordingly, the system is operative to extract information from multi-color forms. Further, the system can be adapted to extract information of various colors from a form.

It will be appreciated by those of ordinary skill in the art that the present invention can be embodied in still other specific forms without departing from the spirit or essential characteristics thereof. For example, it will be apparent to workers skilled in the art that the circuit of FIG. 5 and many other of the components of the system of FIG. 3 can be implemented in hardware, software, or combination of the two.

In view of the above-discussed alternatives, and others, it should be understood that all of the disclosed embodiments are to be considered to be illustrative and not restrictive. The scope of the present invention is defined by the appended claims rather than the foregoing description, and all changes that come within the meaning and range of equivalents thereof are intended to be embraced by the present invention.

What is claimed is:

1. A system for extracting handwritten and typed information of a predetermined color from a form printed in a different color, comprising:
   scanner means for scanning pixel locations on a printed form;
   detector means for detecting at least two color values for each scanned pixel location;
   comparator means for comparing the detected color values with reference color values;
   identifier means for identifying and distinguishing ones of the pixel locations on the printed form from adjacent pixel locations by comparison of their color values to the reference color values, which identifier means provides a binary output for each scanned pixel location such that one state of the binary output represents correspondence between the detected color values of the scanned pixel location and at least one of the reference color values and, thereby, indicates whether handwritten and typed information on the printed form is to be extracted from the form when the color of the printing on the form is substantially different from the color of the handwritten and typed information at adjacent locations on the printed form; and
   an optical character recognition engine for receiving data regarding identified ones of the pixel locations.

2. A system according to claim 1, wherein scanned pixels having detected color components that equal or exceed said reference color components represent information which is to be extracted from said form.

3. A system according to claim 1, wherein scanned pixels having detected color components that are less than or equal to said reference color components represent information which is to be extracted from said form.

4. A system according to claim 1 further including means to identify form identity codes that have been printed on forms in a standard location.

5. A system according to claim 1 further including a threshold color map and means that automatically identify a form and its color scheme such that threshold values appropriate for the form can be automatically loaded into the threshold color map.

6. A system for extracting handwritten or typed information from forms that have been printed in one or more colors that are different than the color of the handwritten or typed information, comprising:
   scanner means for scanning selected pixel locations on a printed form;
   color convertor means comprising a dichroic filter means for detecting at least two color values for each scanned pixel location;
   comparator means for comparing the detected color values with reference color values;
   identifier means for providing a binary output for each scanned pixel location which distinguishes certain ones of the pixel locations on the printed form from adjacent pixel locations on the printed form, with one state of the binary output representing correspondence between the detected color values of the scanned pixel location and at least one of the reference color values to, thereby, identify whether handwritten and typed information should be extracted from the form by comparison of color values at the scanned pixel locations with the reference color values;

an optical character recognition engine for receiving data regarding identified ones of the pixel locations; and threshold color map means that automatically identify a printed form and its color scheme.

7. A system according to claim 6 wherein scanned pixels having detected color components that equal or exceed said reference color components represent information which is to be extracted from said form.

* * * * *